United States Patent
Dang et al.

(10) Patent No.: US 10,216,774 B2
(45) Date of Patent: Feb. 26, 2019

(54) MULTIPLE VERSIONS OF TRIGGERS IN A DATABASE SYSTEM

(71) Applicant: International Business Machines Corporation, Armonk, NY (US)

(72) Inventors: Tammie Dang, Morgan Hill, CA (US); Illong A. Huang, San Jose, CA (US); David J. Kuang, Elk Grove, CA (US); Fen-Ling Lin, San Jose, CA (US); Claire W. McFeely, San Jose, CA (US); Maryela E. Weihrauch, San Jose, CA (US); Binghui Zhong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 15/192,343

(22) Filed: Jun. 24, 2016

(65) Prior Publication Data
US 2017/0371905 A1     Dec. 28, 2017

(51) Int. Cl.
G06F 17/30     (2006.01)
(52) U.S. Cl.
CPC .... G06F 17/30309 (2013.01); G06F 17/3051 (2013.01); G06F 17/30289 (2013.01)
(58) Field of Classification Search
CPC .......... G06F 17/30309; G06F 17/3052; G06F 17/30289
See application file for complete search history.

(56) References Cited

U.S. PATENT DOCUMENTS

| 7,580,958 | B2 | 8/2009 | Chen et al. | |
|---|---|---|---|---|
| 7,912,819 | B2 | 3/2011 | He et al. | |
| 8,738,663 | B2 | 5/2014 | Gonzalez et al. | |
| 2002/0143746 | A1* | 10/2002 | Levy .................. | G06F 17/3051 |
| 2002/0184207 | A1* | 12/2002 | Anderson ........... | G06F 17/3051 |
| 2009/0037360 | A1 | 2/2009 | Melamed | |
| 2009/0171903 | A1 | 7/2009 | Lin et al. | |
| 2013/0179255 | A1* | 7/2013 | Joa ........................ | G06Q 30/02 |
| | | | | 705/14.49 |

OTHER PUBLICATIONS

Anonymous, "Method for Managing Version of Database Schema", IP.com, May 2013.
Chakkarapani, M. et al, "Avoid code duplication in building multi-version web service through common object mapping", IP.com, Feb. 2014.

* cited by examiner

Primary Examiner — Tarek Chbouki
(74) Attorney, Agent, or Firm — North Shore Patents, P.C.; Michele Liu Baillie

(57) ABSTRACT

In managing multiple versions of triggers, a database system creates a first version of a trigger to apply a first set of actions in response to a first triggering event, which includes: creating a first package for the first version of the trigger to include the first set of actions; linking the first package to the database object; and setting the first package as a current version of the trigger. The database system creates a second version of the trigger to apply a second set of actions to the database object in response to a second triggering event, which includes: creating a second package for the second version of the trigger to include the second set of actions; and linking the second package to the database object. In response to a command, the database system sets the current version of the trigger to the second package.

17 Claims, 4 Drawing Sheets

MULTIPLE VERSIONS OF TRIGGERS IN A DATABASE SYSTEM

BACKGROUND

In a database system, a trigger defines a set of actions that are executed when a delete, insert, or update operation occurs on a specified table or view. When such an operation is executed, the trigger is said to be "activated". Triggers are usually defined and activated along with referential constraints and check constraints to enforce data integrity rules. For example, before inserting into an employee table, the new data such as employee's birth date and social security number should be validated and after the insert is done, corresponding rows should be added to the employee tax and salary tables.

Because triggers move the business rule application logic into the database system, managing triggers becomes an important task for the database administrators. Similar to applications, logic can be changed and new actions may be needed in triggers. To do so, the existing trigger must be deleted or "dropped", and then the trigger must be recreated with the changed or new actions. Dropping a trigger requires an invalidation process, including invalidating statements that cause the trigger to be activated that may still be stored in memory, making the changing of triggers inefficient. Further, the dropping of a trigger with the intent to change the definition and "redefine it" will affect the trigger activation time. Thus, if multiple triggers are defined on a table for the same triggering event, they are activated in the order in which they were defined. If a trigger in a middle of the order is dropped and recreated, then this recreated trigger will be placed at the end of the order instead of its original place.

SUMMARY

Disclosed herein is a method for multiple versions of triggers in a database system and a computer program product as specified in the independent claims. Embodiments of the present invention are given in the dependent claims. Embodiments of the present invention can be freely combined with each other if they are not mutually exclusive.

According to an embodiment of the present invention, in a method for managing multiple versions of triggers in a database system, the database system receives a first command to create a first version of a trigger to apply a first set of actions in response to a first triggering event. Based on the first command, the database system creates the first version of the trigger to apply the first set of actions in response to the first triggering event. In creating the first version, the database system creates a first package for the first version of the trigger, where the first package includes the first set of actions, links the first package to the database object, and sets the first package as a current version of the trigger. The database system further receives a second command to create a second version of the trigger to apply a second set of actions in response to a second triggering event. Based on the second command, the database system creates the second version of the trigger to apply the second set of actions in response to the second triggering event. In creating the second version, the database system creates a second package for the second version of the trigger, where the second package includes the second set of actions, and links the second package to the database object. The database system receives a third command to set the current version of the trigger to the second version, and in response, sets the second package as the current version of the trigger.

DETAILED DESCRIPTION

Embodiments of the present invention manage multiple versions of triggers in a database system. Multiple versions of the same trigger may be maintained in the database system, without the need to delete an existing version before implementing a new version. Any version of a trigger may be designated as the current version of the trigger. With the present invention, contents of a trigger may be altered by defining or replacing versions of the trigger without affecting the trigger activation order.

Triggers are typically used to enforce data integrity rules. The body of the trigger contains a set of actions that are executed when a data change operation occurs on a database object, such as a table or a view. The trigger also contains the activation time (before or after, or instead of a data change operation), a triggering event (insert, update or delete operation on the table or view), and the trigger granularity (whether the actions are to be performed for each row or for each statement).

Figure 1:
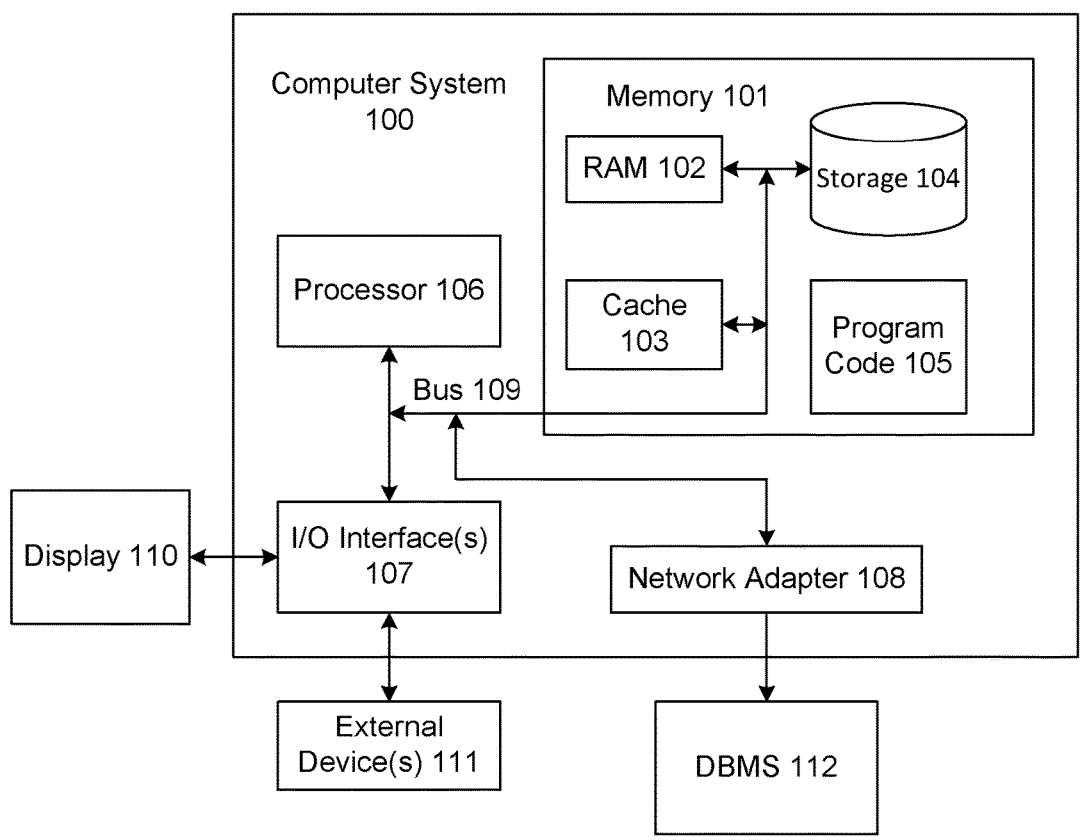
FIG. 1 illustrates a computer system for implementing embodiments of the present invention.

FIG. 1 illustrates a computer system for implementing embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more database management systems (DBMS) 112 via network adapter 108.

Figure 2:
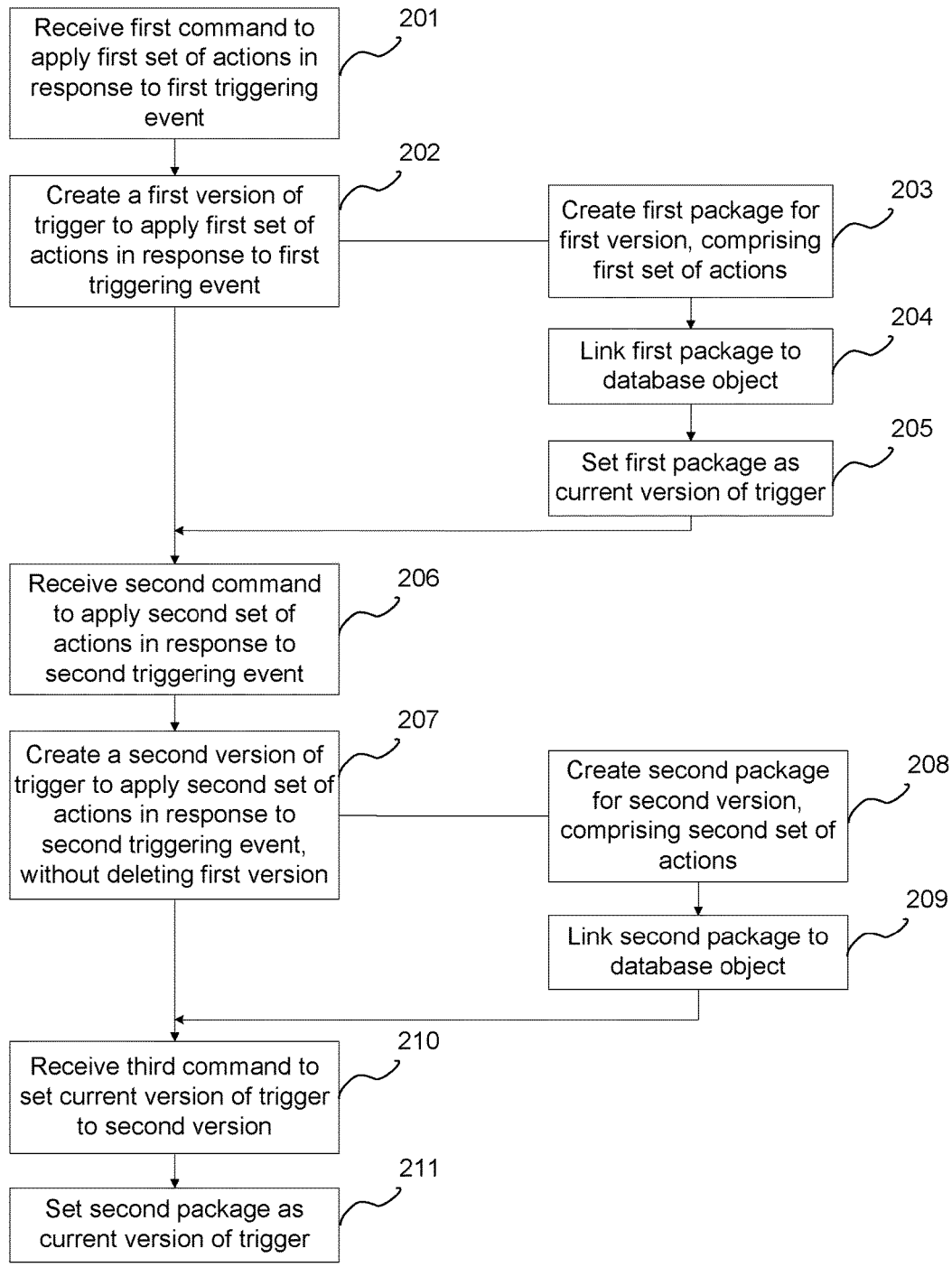
FIG. 2 illustrates a method for managing multiple versions of triggers in a database system according to embodiments of the present invention.

FIG. 2 illustrates a method for managing multiple versions of triggers in a database system according to embodiments of the present invention. The database system receives a first command to create a trigger to apply a first set of actions in response to a first triggering event (201). Based on the first command, the database system creates the first version of the trigger to apply the first set of actions in response to the first triggering event (202). In creating the first version of the trigger, the database system creates a first package for the first version, where the first package comprises the first set of actions (203). The database system links the first package to a database object (204) and sets the first package as the current version of the trigger (205). This first version is the initial version of the trigger. Over time, the actions of the trigger may need to be changed or updated. The database system then receives a second command to define a second version of the trigger to apply a second set of actions in response to a second triggering event (206). Based on the second command, the database system creates the second version of the same trigger to apply the second set of actions in response to the second triggering event (207), without deleting the first version of the trigger. In creating the second version, the database system creates a second package for the second version, separate from the first package, where the second package comprises the second set of actions (208). The database system links the second package to the database object (209). When the database system receives a third command to set the current version of the trigger to the second version (210), the database system responds by setting the second package as the current version of the trigger (211).

In this illustrative embodiment, the triggering event for the first and second versions are the same event, and only one version of the trigger may be set as the current version of the trigger at any point in time. When the data change operation occurs on the object of the trigger, the database system automatically activates the version of the trigger that's set as the current version at this point in time. The automatic activation of the current version of the trigger is described and illustrated below with reference to FIGS. 3 and 4. Although the illustrated embodiments are described for triggers with a triggering event, the present invention may also be applied to multi-event triggers as well, where the multi-event trigger is defined to respond to multiple trigger events.

Figure 3:
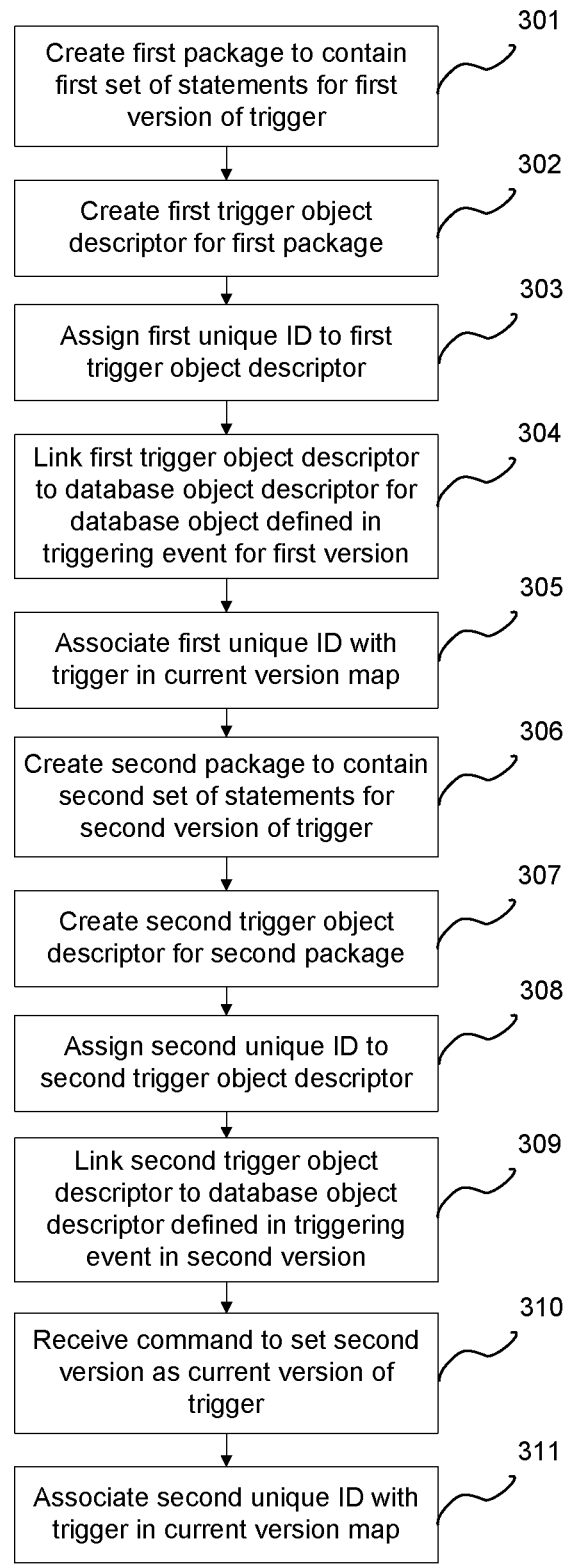
FIG. 3 illustrates in more detail a method for managing multiple versions of triggers in a database system according to embodiments of the present invention.

FIG. 3 illustrates in more detail a method for managing multiple versions of triggers in a database system according to embodiments of the present invention. Based on the first command, the database system creates an initial version of a trigger by creating a first package to contain a first set of statements for a first version of the trigger (301). The database system also creates a first trigger object descriptor for the first package (302) and assigns a first unique identifier (ID) to the first trigger object descriptor (303). The first trigger object descriptor includes the attributes associated with the first version of the trigger, including, but are not limited to, the activation time, granularity, and triggering event for the initial version of the trigger. The database system links the first trigger object descriptor to a database object descriptor for the database object defined in the triggering event for the first version (304). When an operation as defined by the triggering event for the first version occurs on the database object, the statements contained in the body of the first package will be executed. The database system associates the first unique ID of the first package with the trigger object descriptor in the current version map (305). The association of the first unique ID with the trigger in the current version map sets the first version as the current version of the trigger.

At a subsequent point in time, based on the second command, the database system creates a second version of the same trigger by creating a second package, separate from the first package, to contain the second set of statements (306). The database system also creates a second trigger object descriptor for the second package (307) and assigns a second unique ID to the second trigger object descriptor (308). The second trigger object descriptor includes the attributes associated with the second version of the trigger, including, but are not limited to, the activation time, granularity, and triggering event for the second version of the trigger. The database system links the second trigger object descriptor to the database object descriptor for the database object defined in the triggering event for the second version (309). When the second version is set as the current version of the trigger, and an operation as defined by the triggering event for the second version occurs on the database object, the statements contained in the body of the second package will be executed. In one illustrative embodiment, for the sake of consistency of activation behavior, different versions of the same trigger contain the same activation time, granularity, and triggering event. The statements contained in the package, however, may differ. Requiring all versions of the same trigger to have the same activation time ensures that the activation of the trigger is not impacted by which version is set as the current version at this point in time. When the database system receives the third command to set the second version as the current version of trigger (310), the database system responds by associating the second unique ID with the trigger in the current version map (311). When the triggering event defined by the trigger occurs, the database system obtains the unique ID associated with the trigger from the current version map, retrieves the statements contained in the version of the trigger associated with this unique ID, and executes the statements contained in the retrieved version. Any number of versions of the same trigger may be created. Any one of the versions may be set as the current version of the trigger at a particular point in time. Further, any given version of a trigger may be deleted while maintaining any other versions. If the version of trigger to be deleted is set as the current version, then a different version must first be set as the current version before this version of the trigger can be deleted. In addition, a new version of a trigger may be created to replace an existing version. The link between the trigger object descriptor of the existing version to the database object descriptor is then replaced with a link between the trigger object descriptor of the replacement version and the database object (309).

Figure 4:
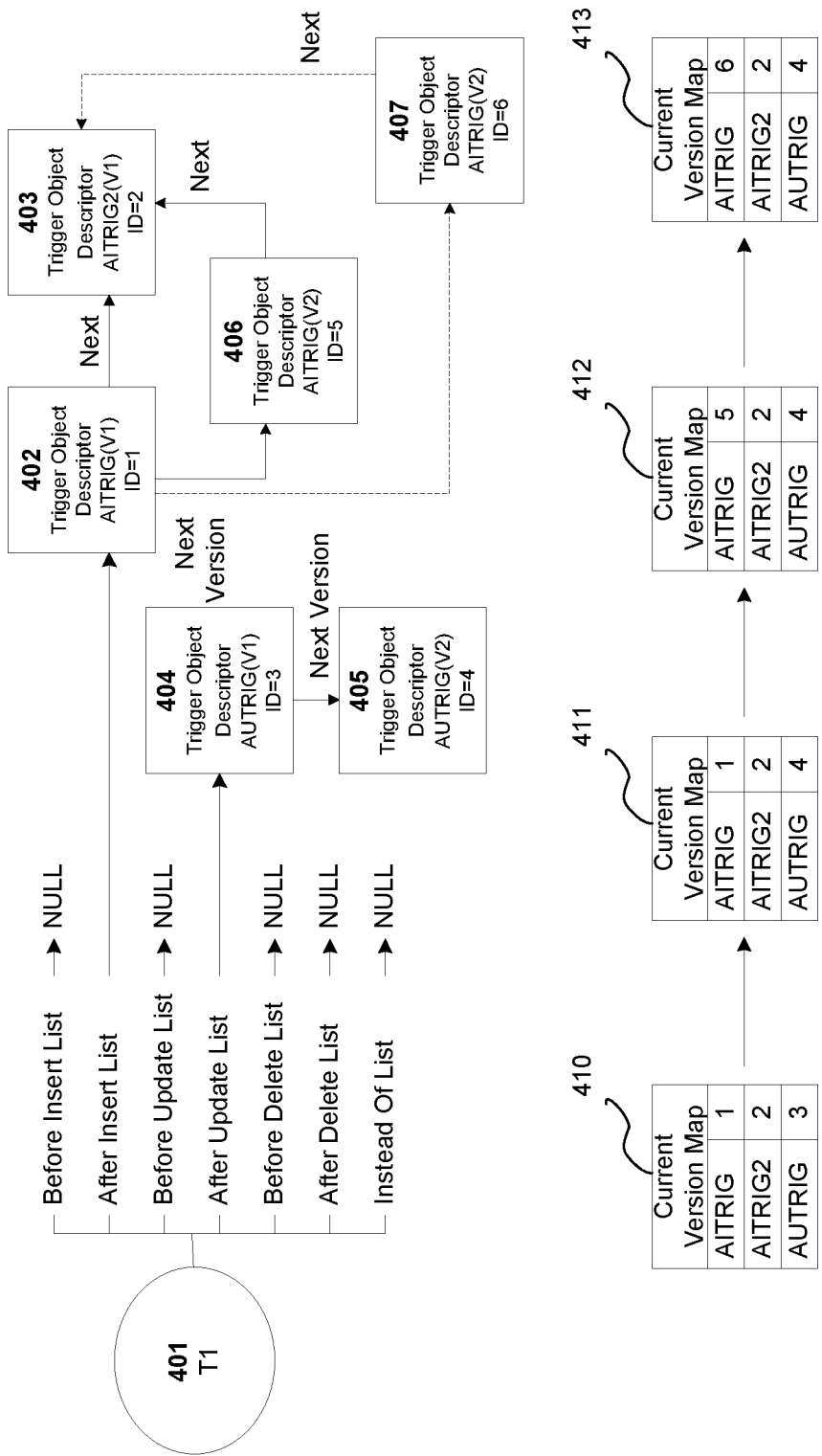
FIG. 4 illustrates an example of the managing of multiple versions of triggers in a database system according to embodiments of the present invention.

FIG. 4 illustrates an example of the managing of multiple versions of triggers in a database system according to embodiments of the present invention. Assume that a table with database object descriptor 'T1' (401) has been created. The database object descriptor, 'T1', includes a set of trigger linked lists for possible activation times, including a list for 'before insert', 'after insert', 'instead of insert', 'before update', 'after update', 'instead of update', 'before delete', 'after delete', and 'instead of delete' triggers. Initially, each of the trigger linked lists contain a null pointer, i.e., points to no triggers.

In this example, assume the following data definition statement syntax are implemented by the database system:
To create a new trigger:
CREATE TRIGGER trigger VERSION version_name {BEFORE, AFTER, INSTEAD OF} {INSERT, UPDATE, DELETE}ON object_name FOR EACH {STATEMENT, ROW} BEGIN statements END.
To add a new version of a trigger:
ALTER TRIGGER trigger ADD VERSION version_name {BEFORE, AFTER, INSTEAD OF} {INSERT, UPDATE, DELETE} ON object_name FOR EACH {STATEMENT, ROW} BEGIN statements END.

To set the current version of the trigger:
ALTER TRIGGER trigger ACTIVATE VERSION version_name.
To delete a version of a trigger:
ALTER TRIGGER trigger DROP VERSION version_name.
To drop a trigger, which deletes all versions of the trigger:
DROP TRIGGER trigger.
To replace an existing version of a trigger:
ALTER TRIGGER trigger REPLACE VERSION version_name {BEFORE, AFTER, INSTEAD OF} {INSERT, UPDATE, DELETE} ON object_name FOR EACH {STATEMENT, ROW} BEGIN statements END.

Assume that the following statements are executed:
(A) CREATE TRIGGER AITRIG VERSION V1 AFTER INSERT ON T1 FOR EACH STATEMENT BEGIN . . . END;
(B) CREATE TRIGGER AITRIG2 VERSION V1 AFTER INSERT ON T1 FOR EACH STATEMENT BEGIN . . . END; and
(C) CREATE TRIGGER AUTRIG VERSION V1 AFTER UPDATE ON T1 FOR EACH ROW BEGIN . . . END.

Referring to both FIGS. 3 and 4, in the execution of the statement A, the database system creates a package, AITRIG (V1), for the first version of trigger, AITRIG, to contain the statements between the BEGIN and the END in statement A (301). The database system creates a trigger object descriptor 402 for AITRIG(V1) (302) and assigns a unique ID=1 to the trigger object descriptor 402 (303). The database system links the trigger object descriptor 402 with T1 (304). Since AITRIG(V1) executes after an insert operation on T1, the database system links the trigger object descriptor 402 to the after insert list for T1. The database system associates the unique ID=1 for the trigger object descriptor 402 with AITRIG in the current version map (305).

In the execution of statement B, the database system creates a package, AITRIG2(V1), for the first version of trigger, AITRIG2, to contain the statements between the BEGIN and the END of statement B (301). The database system creates a trigger object descriptor 403 for AITRIG2 (V1) (302) and assigns a unique ID=2 to the trigger object descriptor 403 (303). The database system links the trigger object descriptor 403 with T1 (304). Since AITRIG2(V1) executes after an insert operation on T1, the database system links the trigger object descriptor 403 to the after insert list for T1. Here, assume that AITRIG2(V1) is created after AITRIG(V1). The trigger object descriptor 403 for AITRIG2(V1) is thus added to the after insert list, where the trigger object descriptor 402 points to the trigger object descriptor 403 as the next trigger on the list. The database system associates the unique ID=2 for the trigger object descriptor 403 with AITRIG2 in the current version map (305).

In the execution of statement C, the database system creates a package, AUTRIG(V1), for the first version of trigger, AUTRIG, to contain the statements between the BEGIN and the END in statement C (301). The database system creates a trigger object descriptor 404 for AUTRIG (V1) (302) and assigns a unique ID=3 to the trigger object descriptor 404 (303). The database system links the trigger object descriptor 404 with T1 (304). Since AUTRIG(V1) executes after an update operation on T1, the database system links the trigger object descriptor 404 to the after update list for T1. The database system associates the unique ID=3 for the trigger object descriptor 404 with AUTRIG in the current version map (305).

After the execution of statements A-C, the current version map contains the associations as illustrated in map 410.

Assume further that the following statements are executed:
(D) ALTER TRIGGER AUTRIG ADD VERSION V2 AFTER UPDATE ON T1 FOR EACH ROW BEGIN . . . END; and
(E) ALTER TRIGGER AUTRIG ACTIVATE VERSION V2.

In the execution of statement D, the database system creates a package for a second version of AUTRIG, separate from the package for the first version of AUTRIG, to contain the statements between the BEGIN and the END of statement D (306). The database system creates a trigger object descriptor 405 for AUTRIG(V2) (307) and assigns a unique ID=4 to the trigger object descriptor 405 (308). The database system links the trigger object descriptor 405 with T1 (309), with the trigger object descriptor 404 pointing to the trigger object descriptor 405 as the next version of AUTRIG in the after update list. When the database system receives statement E to change the current version of AUTRIG to V2 (310), the database system responds by associating the unique ID=4 of the trigger object descriptor 405 with AUTRIG in the current version map (311). After the execution of statements D-E, the current version map contains the associations as illustrated in map 411. When a follow-on UPDATE statement occurs on T1, the trigger object descriptor assigned unique ID=4, i.e., the second version of AUTRIG, will be executed by the database system.

Assume further that the following statements are executed:
(F) ALTER TRIGGER AITRIG ADD VERSION V2 AFTER INSERT ON T1 FOR EACH ROW BEGIN . . . END
(G) ALTER TRIGGER AITRIG ACTIVATE VERSION V2.

In the execution of statement F, the database system creates a package, AITRIG(V2), for the second version of trigger, AITRIG, separate from the package for the first version of the trigger, to contain the statements between the BEGIN and the END in statement F (306). The database system creates a trigger object descriptor 406 for AITRIG(V2) (307) and assigns a unique ID=5 to the trigger object descriptor 406 (308). The database system links the trigger object descriptor 406 with T1 (309), with the trigger object descriptor 402 pointing to the trigger object descriptor 406 as the next version of AITRIG in the after insert list, and to the trigger object descriptor 403 as the next trigger in the after insert list. The pointer from the trigger object descriptor 402 to the trigger object descriptor 403 is removed. When the database system receives statement G to change the current version of AITRIG to V2 (310), the database system responds by associating the unique ID=5 of the trigger object descriptor 406 with AITRIG in the current version map (311). After the execution of statements F-G, the current version map contains the associations as illustrated in map 412. When a follow-on INSERT statement occurs on T1, the trigger object descriptor assigned unique ID=5, i.e., the second version of AITRIG, will be executed by the database system.

Optionally, instead of creating a new version, a given version of a trigger may be replaced. Assume in this example that the following statement is executed:
(H) ALTER TRIGGER AITRIG REPLACE VERSION V2 AFTER INSERT ON T1 FOR EACH STATEMENT BEGIN . . . END.

In the execution of statement H, the database system creates a package for a new second version of AITRIG to contain the statements between the BEGIN and the END of statement H (306). The database system creates a trigger object descriptor 407 for AITRIG(V2) (307) and assigns a unique ID=6 to the trigger object descriptor 407 (308). The database system links the trigger object descriptor 407 with T1 (309), with the trigger object descriptor 402 pointing to the trigger object descriptor 407 as the next version of AITRIG in the after update list, and to the trigger object descriptor 403 as the next trigger in the after insert list. The pointers from trigger object descriptor 406 to trigger object descriptor 403, and from trigger object descriptor 402 to trigger object descriptor 406, are removed. When the second version of AITRIG is the current version as set forth in the current version map, database system also associates the unique ID=6 of the trigger object descriptor 407 with AITRIG in the current version map (311). After the execution of statement H, the current version map contains the associations as illustrated in map 413. When a follow-on INSERT statement occurs on T1, the trigger object descriptor assigned unique ID=6, i.e., the replacement second version of AITRIG, will be executed by the database system.

Assume further that the following statement is executed: ALTER TRIGGER AUTRIG DROP VERSION V2. The database system changes the after update list of T1 such that the pointer to the trigger object descriptor 405 is removed, thus deleted the second version of AUTRIG. However, a current version of a trigger cannot be dropped. Thus, if the second version of AUTRIG is the current version, then an ALTER TRIGGER ACTIVATE VERSION statement to change the current version of AUTRIG to a version other than the second version must first be executed. Then the ALTER TRIGGER DROP VERSION statement may be executed to delete the second version of AUTRIG. Otherwise, an error occurs.

Assume further that the following statement is executed: DROP TRIGGER AUTRIG. The database system changes the after update list of T1 to contain a null pointer, thus dropping AUTRIG. The database system also removes the entry in the current version map for AUTRIG.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing multiple versions of triggers in a database system, comprising:
   receiving a first command to create a first version of a trigger to apply a first set of actions in response to a triggering event, the triggering event comprising a delete, insert or update operation on a database object;
   based on the first command, creating the first version of the trigger to apply the first set of actions in response to the triggering event, comprising:
      creating a first package for the first version of the trigger, the first package comprising the first set of actions;
      linking the first package to the database object; and
      setting the first package as a current version of the trigger;
   receiving a second command to create a second version of the trigger to apply a second set of actions in response to the triggering event;
   based on the second command, creating the second version of the trigger to apply the second set of actions in response to the triggering event, without deleting the first version of the trigger, comprising:
      creating a second package for the second version of the trigger, the second package comprising the second set of actions; and
      linking the second package to the database object;
   receiving a third command to set the current version of the trigger to the second version;
   in response to receiving the third command, setting the second package version as the current version of the trigger;
   determining that the triggering event of the trigger occurs;
   in response to determining that the triggering event occurs, determining that the second version is the current version of the trigger;
   in response to determining that the second version is the current version of the trigger, retrieving the second set of actions comprised in the second package; and
   executing the second set of actions.

2. The method of claim 1, wherein the creating of the first version of the trigger comprises:
   creating the first package to contain a first set of statements for the first version of the trigger;
   creating a first trigger object descriptor for the first package;
   assigning a first unique identifier to the first trigger object descriptor;
   linking the first trigger object descriptor for the database object; and
   associating the first unique identifier with the trigger in a current version map.

3. The method of claim 2, wherein the creating of the second version of the trigger comprises:
   creating the second package to contain a second set of statements for the second version of the trigger;
   creating a second trigger object descriptor for the second package;
   assigning a second unique identifier to the second trigger object descriptor; and
   linking the second trigger object descriptor to database object descriptor.

4. The method of claim 3, wherein in response to receiving the third command, removing the association of the first trigger object descriptor with the trigger from the current version map and associating the second unique identifier with the trigger in the current version map.

5. The method of claim 1, further comprising:
   creating a replacement version to replace a given version of the trigger to apply a replacement set of actions in response to the triggering event, comprising:
      creating a replacement package for the replacement version of the trigger, the replacement package comprising the replacement set of actions; and
      replacing a link between the given version and the database object with a link between the replacement package and the database object.

6. The method of claim 1, further comprising:
   receiving a fourth command to delete a given version of the trigger; and
   in response to receiving the fourth command, removing a link between the given version and the database object.

7. The method of claim 1, further comprising:
   wherein further based on the first command, associating the first version with the trigger in a current version map,
   wherein further based on the third command, removing the association of the first version with the trigger from the current version map and associating the second version with the trigger in the current version map, wherein the determining that the second version is the current version of the trigger comprises determining that the second version is associated with the trigger in the current version map.

8. A computer program product for managing multiple versions of triggers in a database system, the computer program product comprising a computer readable storage medium having program instructions embodied therewith, the program instructions executable by a processor to cause the processor to:
receive a first command to create a first version of a trigger to apply a first set of actions in response to a triggering event, the triggering event comprising a delete, insert or update operation on a database object;
based on the first command, create the first version of the trigger to apply the first set of actions in response to the triggering event, comprising:
create a first package for the first version of the trigger, the first package comprising the first set of actions;
link the first package to the database object; and
set the first package as a current version of the trigger;
receive a second command to create a second version of the trigger to apply a second set of actions in response to the triggering event;
based on the second command, create the second version of the trigger to apply the second set of actions in response to the second triggering event, without deleting the first version of the trigger, comprising:
create a second package for the second version of the trigger, the second package comprising the second set of actions; and
link the second package to the database object;
receive a third command to set the current version of the trigger to the second version;
in response to receiving the third command, set the second version as the current version of the trigger;
determine that the triggering event of the trigger occurs;
in response to determining that the triggering event occurs, determine that the second version is the current version of the trigger;
in response to determining that the second version is the current version of the trigger, retrieve the second set of actions comprised in the second package; and
execute the second set of actions.

9. The computer program product of claim 8, wherein the creating of the first version of the trigger comprises: create the first package to contain a first set of statements for the first version of the trigger; create a first trigger object descriptor for the first package; assign a first unique identifier to the first trigger object descriptor the first trigger object descriptor for the database object; and associate the first unique identifier with the trigger in a current version map.

10. The computer program product of claim 9, wherein the creating of the second version of the trigger comprises:
create the second package to contain a second set of statements for the second version of the trigger;
create a second trigger object descriptor for the second package;
assign a second unique identifier to the second trigger object descriptor; and
link the second trigger object descriptor to database object descriptor.

11. The computer program product of claim 10, wherein in response to receiving the third command, remove the association of the first trigger object descriptor with the trigger from the current version map and associate the second unique identifier with the trigger in a current version map.

12. The computer program product of claim 8, further comprising:
wherein further based on the first command, associate the first version with the trigger in a current version map,
wherein further based on the third command, remove the association of the first version with the trigger from the current version map and associate the second version with the trigger in the current version map,
wherein the determining that the second version is the current version of the trigger comprises: determine that the second version is associated with the trigger in the current version map.

13. A system, comprising:
a processor; and
a computer readable storage medium having program instructions embodied therewith, the program instructions executable by the processor to cause the processor to:
receive a first command to create a first version of a trigger to apply a first set of actions in response to a triggering event, the triggering event comprising a delete, insert or update operation on a database object;
based on the first command, create the first version of the trigger to apply the first set of actions in response to the triggering event, comprising:
create a first package for the first version of the trigger, the first package comprising the first set of actions;
link the first package to the database object; and
set the first package as a current version of the trigger;
receive a second command to create a second version of the trigger to apply a second set of actions in response to the triggering event;
based on the second command, create the second version of the trigger to apply the second set of actions in response to the triggering event, without deleting the first version of the trigger, comprising:
create a second package for the second version of the trigger, the second package comprising the second set of actions; and
link the second package to the database object;
receive a third command to set the current version of the trigger to the second version;
in response to receiving the third command, set the second version as the current version of the trigger;
determine that the triggering event of the trigger occurs;
in response to determining that the triggering event occurs, determine that the second version is the current version of the trigger;
in response to determining that the second version is the current version of the trigger, retrieve the second set of actions comprised in the second package; and
execute the second set of actions.

14. The system of claim 13, wherein the creating of the first version of the trigger comprises:
create the first package to contain a first set of statements for the first version of the trigger;
create a first trigger object descriptor for the first package;
assign a first unique identifier to the first trigger object descriptor;
link the first trigger object descriptor for the database object; and
associate the first unique identifier with the trigger in a current version map.

15. The system of claim 14, wherein the creating of the second version of the trigger comprises:
- create the second package to contain a second set of statements for the second version of the trigger;
- create a second trigger object descriptor for the second package;
- assign a second unique identifier to the second trigger object descriptor; and
- link the second trigger object descriptor to database object descriptor.

16. The system of claim 15, wherein in response to receiving the third command, remove the association of the first trigger object descriptor with the trigger from the current version map and associate the second unique identifier with the trigger in the current version map.

17. The system of claim 13, further comprising:
- wherein further based on the first command, associate the first version with the trigger in a current version map,
- wherein further based on the third command, remove the association of the first version with the trigger from the current version map and associate the second version with the trigger in the current version map,
- wherein the determining that the second version is the current version of the trigger comprises: determine that the second version is associated with the trigger in the current version map.

* * * * *